(12) United States Patent
Kim et al.

(10) Patent No.: US 9,207,320 B2
(45) Date of Patent: Dec. 8, 2015

(54) METHOD AND SYSTEM FOR PRODUCING CLASSIFIER FOR RECOGNIZING OBSTACLE

(71) Applicant: Hyundai Motor Company, Seoul (KR)

(72) Inventors: Jin Hak Kim, Seoul (KR); Kyung Ho Yoo, Gyeonggi-do (KR); Yoon Ho Jang, Gyeonggi-do (KR); Seong Su Im, Gyeonggi-do (KR); Hui Sung Lee, Gyeonggi-do (KR); Kyoung Moo Min, Gyeonggi-do (KR); Eun Jin Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 455 days.

(21) Appl. No.: 13/713,820

(22) Filed: Dec. 13, 2012

(65) Prior Publication Data

US 2014/0035777 A1      Feb. 6, 2014

(30) Foreign Application Priority Data

Aug. 6, 2012   (KR) .................. 10-2012-0085546

(51) Int. Cl.
   *G08G 1/16*    (2006.01)
   *G01S 7/292*   (2006.01)
   *G01S 7/41*    (2006.01)
   *G01S 13/93*   (2006.01)
   *G01S 13/91*   (2006.01)
   *G01S 13/86*   (2006.01)

(52) U.S. Cl.
   CPC .............. *G01S 13/93* (2013.01); *G01S 7/292* (2013.01); *G01S 7/41* (2013.01); *G01S 13/86* (2013.01); *G01S 13/91* (2013.01); *G01S 13/931* (2013.01); *G08G 1/16* (2013.01)

(58) Field of Classification Search
   CPC ........... G08G 1/16–1/168; G01S 7/292–7/295; G01S 7/41–7/418; G01S 13/91; G01S 13/93; G01S 13/391
   USPC ........... 342/70–72, 90–97, 175, 189; 382/104
   See application file for complete search history.

(56) References Cited

U.S. PATENT DOCUMENTS

| | | | | |
|---|---|---|---|---|
| 5,706,355 A | * | 1/1998 | Raboisson et al. | 382/104 |
| 5,761,326 A | * | 6/1998 | Brady et al. | 382/103 |
| 6,192,150 B1 | * | 2/2001 | Leow et al. | 382/190 |
| 6,266,442 B1 | * | 7/2001 | Laumeyer et al. | 382/190 |
| 6,380,884 B1 | * | 4/2002 | Satou et al. | 342/70 |
| 6,518,916 B1 | * | 2/2003 | Ashihara et al. | 342/70 |

(Continued)

FOREIGN PATENT DOCUMENTS

KR    10-2005-0007918 A    1/2005

*Primary Examiner* — Peter Bythrow
(74) *Attorney, Agent, or Firm* — Mintz Levin Cohn Ferris Glovsky and Popeo, P.C.; Peter F. Corless

(57) ABSTRACT

The present invention provides a method and a system for producing a classifier for recognizing an obstacle, including a processor configured to: display surface data of a plurality of obstacles measured by a distance measurement sensor in a two-dimensional (2D) coordinate system; group and classify the surface data displayed in the 2D coordinate system for each obstacle; setting a plurality of feature references to analyze region based features displayed for each obstacle in the 2D coordinate system and calculate the respective feature references for each obstacle grouping; and producing the classifier by applying a weight to each of the feature references.

8 Claims, 6 Drawing Sheets

(56) References Cited

U.S. PATENT DOCUMENTS

| | | | |
|---|---|---|---|
| 6,967,612 B1* | 11/2005 | Gorman et al. | 342/22 |
| 7,046,822 B1* | 5/2006 | Knoeppel et al. | 382/103 |
| 7,158,217 B2* | 1/2007 | Hoashi et al. | 356/4.01 |
| 7,460,951 B2* | 12/2008 | Altan et al. | 701/536 |
| 8,098,889 B2* | 1/2012 | Zhu et al. | 382/103 |
| 8,311,343 B2* | 11/2012 | Chung | 382/224 |
| 8,803,966 B2* | 8/2014 | Zhang et al. | 348/119 |
| 2001/0015698 A1* | 8/2001 | Tokoro | 342/70 |
| 2004/0117090 A1* | 6/2004 | Samukawa et al. | 701/45 |
| 2004/0183712 A1* | 9/2004 | Levitan et al. | 342/22 |
| 2004/0234136 A1* | 11/2004 | Zhu et al. | 382/224 |
| 2004/0246167 A1* | 12/2004 | Kumon et al. | 342/70 |
| 2005/0201591 A1* | 9/2005 | Kiselewich | 382/104 |
| 2005/0219506 A1* | 10/2005 | Okuda et al. | 356/28 |
| 2005/0244034 A1* | 11/2005 | Miyahara | 382/106 |
| 2006/0023917 A1* | 2/2006 | Dickmann et al. | 382/104 |
| 2007/0024494 A1* | 2/2007 | Dizaji et al. | 342/90 |
| 2007/0206849 A1* | 9/2007 | Sakata et al. | 382/157 |
| 2008/0008355 A1* | 1/2008 | Okamoto et al. | 382/104 |
| 2008/0069402 A1* | 3/2008 | Dhua et al. | 382/104 |
| 2008/0112593 A1* | 5/2008 | Ratner et al. | 382/103 |
| 2008/0219565 A1* | 9/2008 | Hattori | 382/224 |
| 2008/0240505 A1* | 10/2008 | Nakamura et al. | 382/103 |
| 2008/0240506 A1* | 10/2008 | Nakamura et al. | 382/104 |
| 2008/0273752 A1* | 11/2008 | Zhu et al. | 382/103 |
| 2010/0017060 A1* | 1/2010 | Zhang et al. | 701/41 |
| 2010/0097455 A1* | 4/2010 | Zhang et al. | 348/119 |
| 2010/0097458 A1* | 4/2010 | Zhang et al. | 348/119 |
| 2010/0100268 A1* | 4/2010 | Zhang et al. | 701/25 |
| 2010/0104199 A1* | 4/2010 | Zhang et al. | 382/199 |
| 2010/0191391 A1* | 7/2010 | Zeng | 701/1 |
| 2011/0001615 A1* | 1/2011 | Kuoch et al. | 340/436 |
| 2011/0181456 A1 | 7/2011 | Luebbert et al. | |
| 2012/0045119 A1* | 2/2012 | Schamp | 382/157 |
| 2012/0127018 A1* | 5/2012 | Nakagawa | 342/90 |
| 2012/0212615 A1* | 8/2012 | Ishii | 348/148 |
| 2012/0242529 A1* | 9/2012 | Shimizu | 342/70 |
| 2013/0136308 A1* | 5/2013 | Lo et al. | 382/104 |
| 2013/0187806 A1* | 7/2013 | Takemoto | 342/90 |

* cited by examiner

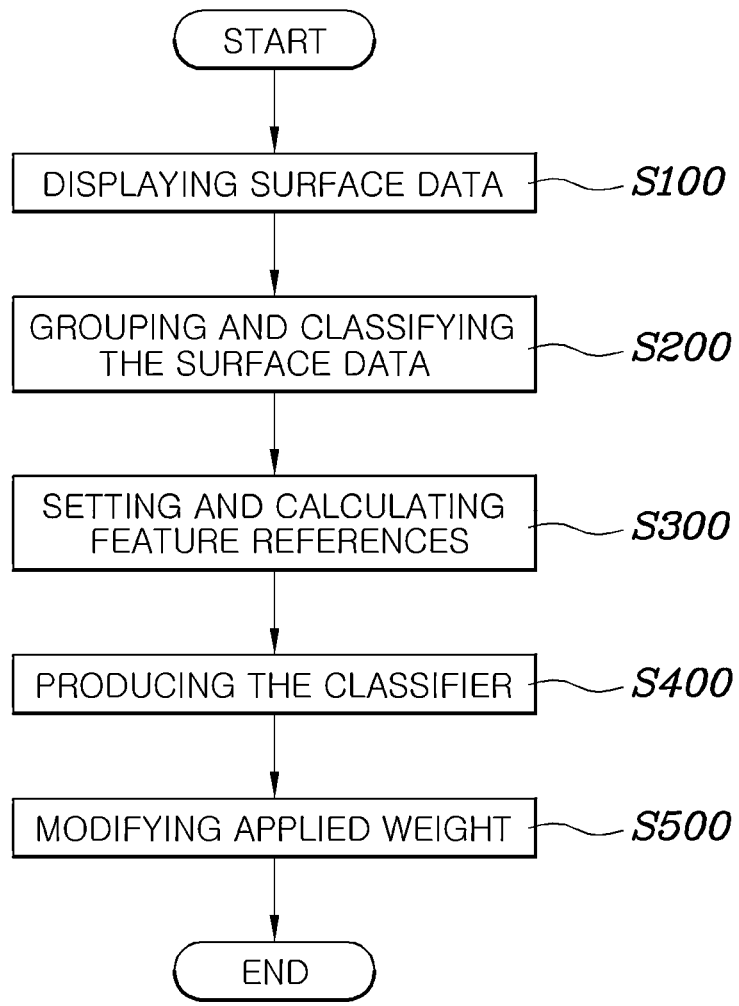

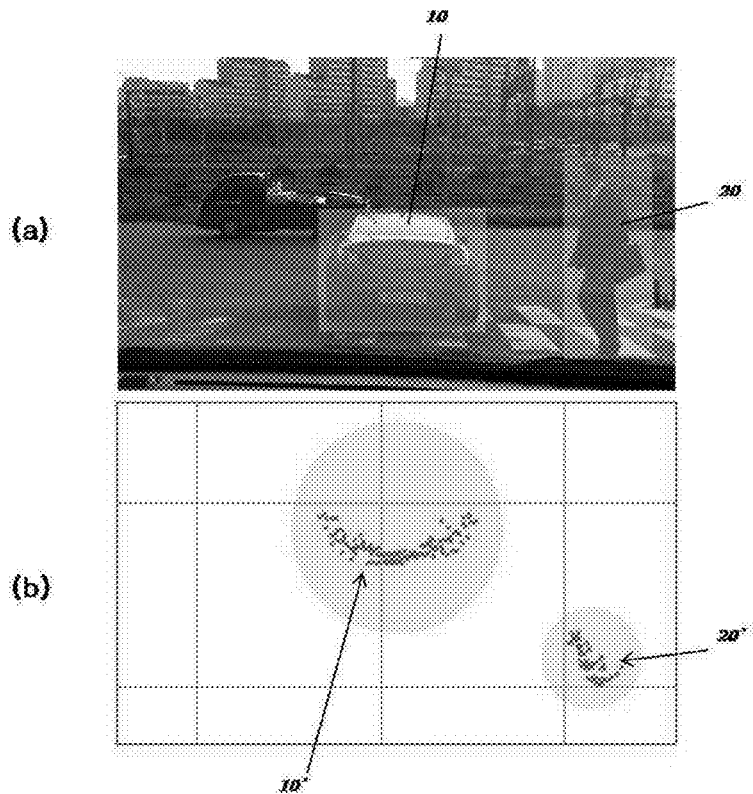

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 |   |   |   |   |   |   |   |   |    |    |    |    |    |    |
| 2 | 1 | 1 | 1 |   |   |   |   |   |   |    |    |    |    |    |    |
| 3 |   |   | 1 |   |   |   |   |   |   |    |    |    |    |    |    |
| 4 |   | 1 |   |   |   |   |   | 1 | 1 | 1  |    |    |    |    |    |
| 5 |   |   | 1 | 1 |   |   | 1 |   |   |    | 1  | 1  |    |    |    |
| 6 |   |   |   |   |   | 1 |   | 1 |   |    |    | 1  | 1  |    |    |
| 7 |   |   |   |   |   |   | 1 |   |   |    |    |    | 1  |    |    |
| 8 |   |   |   |   |   |   |   |   |   |    |    | 1  |    |    |    |
| 9 |   |   |   |   |   |   |   |   |   |    |    | 1  |    |    |    |
| 10|   |   |   |   |   |   |   |   |   |    |    | 1  |    |    |    |

METHOD AND SYSTEM FOR PRODUCING CLASSIFIER FOR RECOGNIZING OBSTACLE

CROSS-REFERENCE

This application claims under 35 U.S.C. §119(a) the benefit of Korean Patent Application No. 10-2012-0085546 filed Aug. 6, 2012 the entire contents of which are incorporated herein by reference.

BACKGROUND OF THE INVENTION (a) Field of the Invention

The present invention relates to a method for producing a classifier for recognizing an obstacle which may automatically produce the classifier for classifying an obstacle from data measured through a laser sensor or a radar sensor.

(b) Description of the Related Art

Many automobile accidents are caused today by driver error (e.g., 16%) and the delay of discovering an accident factor (e.g., 50%) and active safety techniques including accident avoidance, preventative safety, collision safety, and the like may contribute significantly to the reduction of traffic accidents. In particular, a technique of recognizing a vehicle obstacle may be needed to reduce the risk of vehicle accidents while driving by actively predicting and detecting an obstacle while driving a vehicle.

A pure passive protection system may be a shock absorption technique such as making a front surface of the vehicle smooth or ensuring a modifiable space between an engine and a hood. A collision operation protection system may better absorb energy generated upon a collision by redesigning a vehicular hood. This design may include an actuator which is actuated by sensing a collision moment between a pedestrian and the vehicle. An active protection system may be a method of reducing the risk or controlling an emergency brake assistance function using an active safety system such as an electronic stability control (ESC) in an emergency situation. A preventative protection system may be a technique preventing the collision accident between the vehicle and the pedestrian in advance by distinguishing the pedestrian from various other obstacles on a road by using sensors such as a radar or a laser scanner and a camera and actuating a safety system such as an active brake system.

According to a classification of various protection systems based on traffic accident data in e.g., the European Union, reducing a braking distance using the preventative protection system may be most effective in protecting a pedestrian. In particular, to assure strong actuation of a pedestrian protection system, it may be important to classify the type (e.g., a vehicle, a bicycle, a pedestrian, a structure, and the like) of the obstacle by recognizing the obstacle that may approach the vehicle.

The existing front obstacle recognition systems limit a recognition target to a vehicle by restraining an actuation environment to a driveway. Accordingly, recognizing a pre-determined obstacle in addition to the vehicle may involve two steps.

The first step is the extension of a recognition range. For example, the pedestrian may be smaller and slower than the vehicle. Therefore, to recognize the obstacle, a signal must be reviewed as an obstacle candidate in a vehicle recognition system. In other words, the reliability and the characteristic of the sensor serve as key elements in recognition performance.

The second step may be the classification of the type of detected obstacle. In recent years, the pedestrian protection system has reflected the position of a front obstacle and the type of the obstacle to the controller of the system. In other words, when the front obstacle is a pedestrian, is the system may be designed to actively warn and avoid the front obstacle. Accordingly, the classification of the type of front obstacle may be required to actively protect the pedestrian while decreasing driver interference with the collision avoidance system.

Moreover, the present invention proposes an obstacle detecting method using only a distance measurement sensor (the radar and the laser scanner) and a new recognition technique capable of determining the type of the obstacle to perform the two steps as described above. The method may include a database in which distance information of an object and a pattern characteristic of a region are extracted and thereafter, accumulated.

FIG. 1 is an exemplary diagram illustrating measurement ranges of various sensors for recognizing an obstacle. Among the measurement sensors, the radar sensor may be large in length but small in width and the laser sensor may be large in width but small in length. A video sensor may perform an intermediate role between the sensors, but it may be time extensive to analyze the obstacle through an actual image.

Therefore, a technique may be needed, which can increase both time and accuracy of recognition by designing and mounting a classifier with substantially high accuracy, separating the obstacle while using the laser or the radar sensor as the distance measurement sensor.

The description provided above as a related art of the present invention is just for helping in understanding the background of the present invention and should not be construed as being included in the related art known by those skilled in the art.

SUMMARY OF THE INVENTION

The present invention has been made in an effort to provide a method for producing a classifier for recognizing an obstacle, which may automatically and substantially rapidly produce the classifier as a logic capable of more accurately and rapidly distinguish the obstacle through a data value of a distance measurement sensor.

In one embodiment, the present invention provides a method for producing a classifier for recognizing an obstacle, including displaying, by a processor, surface data of the obstacle measured by a distance measurement sensor on a two-dimensional (2D) coordinate system; grouping and classifying, by the processor, the surface data displayed in the 2D coordinate system for each obstacle; setting, by the processor, a plurality of feature references to analyze region based features displayed for each obstacle in the 2D coordinate system and calculating, by the processor, the respective feature references for each grouped obstacle; and producing, by the processor, the classifier by applying a weight to each of the feature references.

The displaying step may further include controlling the weight when a result value is not mismatched with a predetermined value by deducing a result value depending on the produced classifier and comparing the result value with the predetermined value. The distance measurement sensor may be a radar sensor or a laser sensor. Furthermore, the surface data of the obstacle, which is measured by using the distance measurement sensor, may be projected and displayed, by the processor, vertically to a ground surface coordinate system expressed an X-Y axis which may be parallel to a ground surface.

The feature references may includes a dimension reference which may be a dimension value occupied by the grouped obstacle in the 2D coordinate system. Additionally, a centroid reference which is a coordinate value of a centroid of the grouped obstacle displayed in the 2D coordinate system may be included in the feature reference. A spacing reference may also be included in the feature reference, which is a level in which the respective surface data constituting the grouped obstacle displayed in the 2D coordinate system may be spaced apart from the coordinate value of the centroid of the corresponding obstacle. Furthermore, the feature references may include a perimeter reference which is a perimeter length value of the grouped obstacle. Lastly, a roundness reference indicating a roundness level calculated by the area value and the perimeter length value of the grouped obstacle may be included in the feature reference.

[NOTE: This section on vehicle language was moved to the Description of Preferred Embodiments.]

BRIEF DESCRIPTION OF THE DRAWINGS

The above and other features, objects and advantages of the present invention will now be described in detail with reference to certain exemplary embodiments thereof illustrated in the accompanying drawings which are given hereinbelow by way of illustration only, and thus are not limitative of the present invention, and wherein:

FIG. 2 is an exemplary flowchart of a method for producing a classifier for recognizing an obstacle according to an exemplary embodiment of the present invention;

FIG. 3 is an exemplary diagram illustrating a process of acquiring surface data displayed in a two-dimensional coordinate system, according to an exemplary embodiment of the present invention;

FIG. 4 is an exemplary diagram illustrating the surface data displayed in the two-dimensional coordinate system of FIG. 3, according to an exemplary embodiment of the present invention;

FIG. 5 is an exemplary diagram illustrating a projection reference of the method for producing a classifier for recognizing an obstacle, according to an exemplary embodiment of the present invention;

FIG. 6 is an exemplary diagram illustrating a profile reference of the method for producing a classifier for recognizing an obstacle, according to an exemplary embodiment of the present invention;

Figure 1:
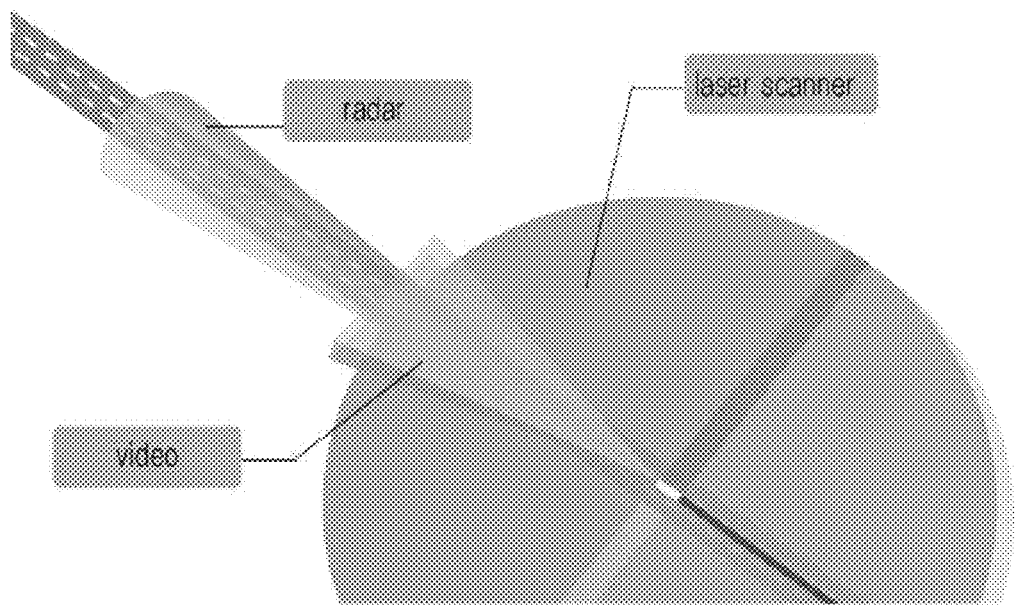
FIG. 1 is an exemplary diagram illustrating measurement ranges of various sensors for recognizing an obstacle.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below.

FIG. 2 is an exemplary flowchart of a method for producing a classifier for recognizing an obstacle, and the method may include: displaying (S100), by a processor, surface data of the obstacle measured by a distance measurement sensor in a two-dimensional (2D) coordinate system; grouping and classifying (S200), by the processor, the surface data displayed in the 2D coordinate system for each obstacle; setting, by the processor, a plurality of feature reference to analyze (S300) region based features displayed for each obstacle in the 2D coordinate system and calculating the respective feature references for each grouped obstacle; and producing (S400), by the processor, the classifier by applying a weight to each of the feature references.

The displaying step (S400) may further include controlling (S500), by the processor, the weight when a result value is not mismatched with a predetermined value by deducing a result value depending on the produced classifier and comparing the result value with the predetermined value.

Moreover, in the method for producing a classifier for recognizing an obstacle according to the present invention, a radar sensor or a laser sensor may be used as the distance measurement sensor to acquire a substantially more accurate and rapid result inexpensively. In step 300, a feature reference may be set to analyze a characteristic based on a distance and thus, the classifier may be generated together with the region based feature reference. In this regard, first, the region based feature reference will be described and thereafter, the distanced based feature reference will be described.

FIG. 3 is an exemplary diagram illustrating a process of acquiring surface data displayed in a 2D coordinate system and as illustrated in FIG. 3A, a front may be measured in a visual field by a distance based sensor. Furthermore, it may be assumed that there are a vehicle and a pedestrian in front.

The measurement data may be expressed as a distance and an angle displayed in the 2D coordinate system as illustrated in FIG. 3B. The surface data of the obstacle measured by the distance measurement sensor may be projected vertically and displayed in a ground surface coordinate system expressed by an X-Y axis, which may be parallel to a ground surface. In other words, the surface data is displayed as viewed through a real aerial photograph.

With the display on the X-Y coordinate, features used during preparing the classifier to be described below may be set in accordance with the display.

The next step includes grouping, by the processor, the displayed data for each obstacle and making a cluster of the grouped data. Furthermore, a plurality of feature references are set by the processor to analyze the region based feature displayed for each obstacle in the 2D coordinate system and to calculate the feature reference for each of the grouped obstacles.

FIG. 4 is an exemplary diagram illustrating the surface data displayed in the 2D coordinate system. As illustrated in the figure, the 2D coordinate system may be expressed as a grid coordinate and the data may be grouped based on data marked in each grid.

The objects distinguished by the grouping may be marked as 1, 2 and 3. Each of the illustrated objects 1, 2 and 3 may be acquired in the coordinate system as illustrated in the figure. The equations hereinbelow are exemplary calculations corresponding to object 1. However, similar equations may be analyzed to obtain the calculations corresponding to objects 2 and 3. Each feature reference may be substituted into the acquired coordinate system. An area reference which is an area value occupied by the grouped obstacle in the 2D coordinate system may be included in the feature reference. The area reference may mean an area occupied by the corresponding obstacle. As illustrated in FIG. 4, object 1 occupies 20 grids, thus the area reference is 20. The following equation may be used to calculate the area reference of object 1:

$$\text{Area: } a = \sum_{(x,y) \in R} x^p y^q = 20. \qquad 1$$

A centroid reference which is a coordinate value of a centroid of the grouped obstacle displayed in the 2D coordinate system may be included in the feature reference. The centroid reference may be calculated by the following equation:

$$\text{Centroid: } (\bar{x}, \bar{y}) = \qquad 2$$

$$\left( \frac{\sum_{(x,y) \in R} x}{20}, \frac{\sum_{(x,y) \in R} y}{20} \right) = \left( \frac{\text{sum}(x)}{20}, \frac{\text{sum}(y)}{20} \right) = (2.7, 3.05).$$

In the calculation of the centroid reference, the number of grids, and a row or a column value checked in a corresponding row or column may be multiplied and added to each other to acquire sum(x) and sum(y), which may be divided by the number of grids as the area to acquire a centroid of an obstacle. For example, for object 1, the sum(x) and sum(y) may be divided by 20 to acquire the centroid of the obstacle.

Moreover, a spacing reference may be included in the feature reference, which is a level in which the respective surface data constituting the grouped obstacle displayed in the 2D coordinate system may be spaced apart from the coordinate value of the centroid of the corresponding obstacle. The spacing reference may be generally classified into a spacing reference-row spaced apart from the centroid based on the row, a spacing reference-column spaced apart from the centroid based on the column, and a spacing reference-mixture spaced apart from the centroid based on both the row and the column.

The spacing references may be expressed as a row variance, a column variance, and a mixed variance, and may be deduced by the following equations:

$$\text{Row variance: } v_{rr} = \frac{\sum_{(x,y) \in R} (x - 2.7)^2}{20} = 3.01. \qquad 3$$

$$\text{Col variance: } v_{cc} = \frac{\sum_{(x,y) \in R} (y - 3.05)^2}{20} = 1.848. \qquad 4$$

$$\text{Mixed variance: } v_{rc} = \frac{\sum_{(x,y) \in R} (x - 2.7)(y - 3.05)}{20} = -1.135. \qquad 5$$

A perimeter reference which is a perimeter length value of the grouped obstacle may be included in the feature reference and may be expressed by the following equation:

$$\text{Perimeter: } p = n_{even} + n_{odd}\sqrt{2} = 10 + 6\sqrt{2} = 18.485 \qquad 6.$$

$n_{even}$: number of even chain $n_{odd}$: number of odd chain

In the perimeter reference, when a neighboring grid is toward the X axis or Y axis in the corresponding grid, '1' is added and when the neighboring grid is adjacent diagonally, 'root 2' is added to acquire the length of a perimeter.

Furthermore, a roundness reference indicating a roundness level calculated by the area value and the perimeter length value of the grouped obstacle may be included in the feature reference, and may be deduced by the following equation:

$$\text{Roundness: } r = \frac{4\pi a}{p^2} = \frac{4\pi * 20}{18.485^2} = 0.736. \qquad 7$$

Roundness may be acquired by measuring the roundness level of the corresponding obstacle and the roundness level may be measured by an area value (a) and a perimeter reference value (p).

From the above analysis, when the area reference, the centroid reference, the spacing reference-column, the spacing reference-row, the spacing reference-mixture, the perimeter reference, and the roundness reference are calculated and deduced with respect to each of the obstacles 1, 2, and 3, the following result values may be calculated.

TABLE 1

| | Area | Centroid | Row | Column | Mixed | Perimeter | Roundness |
|---|---|---|---|---|---|---|---|
| Region 1 | 20 | (2.7, 3.05) | 3.01 | 1.848 | −1.135 | 18.485 | 0.736 |
| Region 2 | 12 | (4.5, 8.5) | 0.917 | 0.917 | 0.0 | 9.657 | 1.617 |
| Region 3 | 18 | (9.5, 6) | 0.25 | 6.667 | 0.0 | 18 | 0.698 |

Moreover, the reference features may be deduced as a distance reference which is a level in which the obstacle is spaced apart from the reference of the grid coordinate in addition to the region reference on the grid coordinate occupied by the obstacle.

In particular, the method of calculating the region references for producing a classifier for recognizing an obstacle may include: displaying (S100), by a processor, surface data of the obstacle measured by a distance measurement sensor in a 2D coordinate system; grouping and classifying (S200), by the processor, the surface data displayed in the 2D coordinate system for each obstacle; setting, by the processor, a plurality of feature references to analyze (S300) region based features displayed for each obstacle in the 2D coordinate system and calculating the respective feature references for each grouped obstacle; and producing (S400), by the processor, the classifier by applying a weight to each of the feature references.

The feature references of the region reference may include a projection reference which is a value acquired by accumulating and projecting the surface data of the grouped obstacle on the X axis or the Y axis of the 2D grid coordinate system. The projection reference may be expressed by a vector constituted by values acquired by accumulating and projecting the surface data on the X axis or Y axis.

Figures 5, 6:
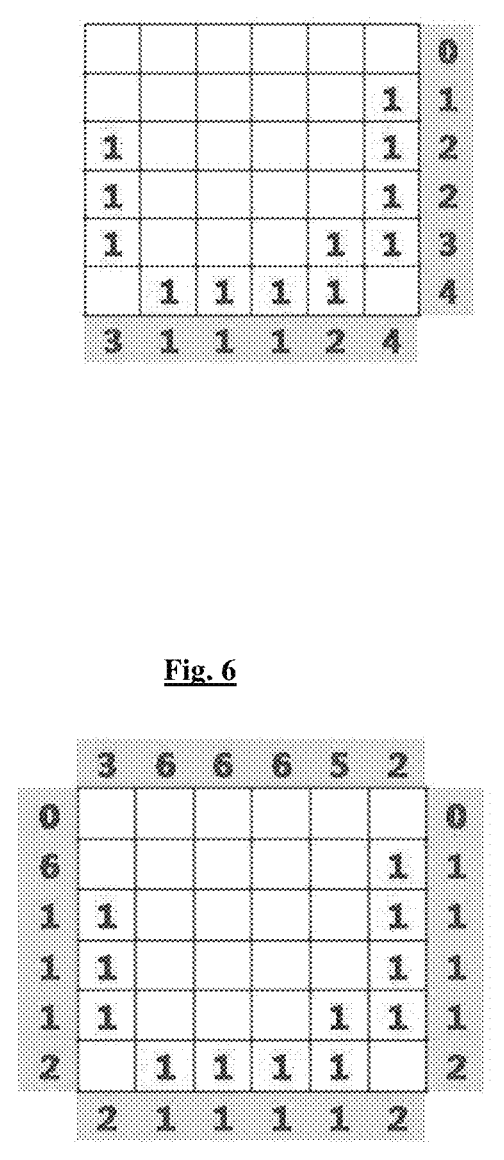

FIG. 5 is an exemplary diagram illustrating the projection reference of the method for producing a classifier for recognizing an obstacle according to an exemplary embodiment of the present invention. In determining a vector in the 2D coordinate system, multiple grids may be positioned in each corresponding row or column which may be counted, overlapped, and projected on the X axis or Y axis of the 2D coordinate system. The generated vector may be expressed as below:

$$Vec=(3,1,1,1,2,4,0,1,2,2,3,4)^T$$

Furthermore, a profile reference may be included in the feature references and may be deduced by designating a rectangular region including the surface data of the grouped obstacle on the 2D grid coordinate system and calculating a distance between the circumference of the region and the circumference of the obstacle for each row and column.

FIG. 6 is an exemplary diagram illustrating a profile reference of the method for producing a classifier for recognizing an obstacle. The profile reference may be expressed as the position of a portion where the grid is initially located when facing circumferences are viewed from different reference circumferences in the rectangular region. For example, in the illustrated grid coordinate, "1" is positioned on the top and since "1" is positioned in a first grid on the right circumference, the profile reference is expressed as "1." However, since "1" is positioned in a sixth grid on the left circumferences, the profile reference is expressed as "6". The profile reference may expressed as follows:

$$Vec=(3,6,6,6,5,2,0,1,1,1,1,2,2,1,1,1,1,2,2,1,1,1,6,0)^T$$

The feature references may further include a curve reference comprising values of angles depending on a course direction when moving from a predetermined grid constituting the surface data of the grouped obstacle from a next neighboring grid.

Figures 7, 8:
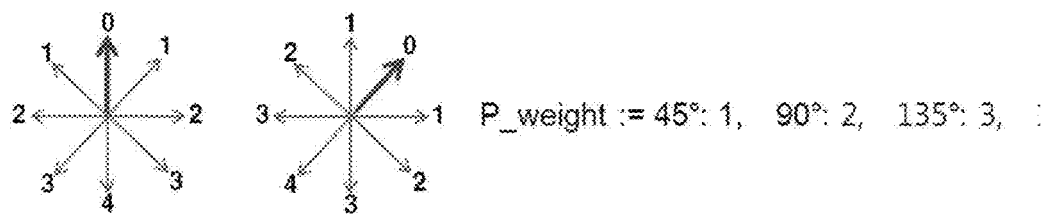
FIGS. 7 to 8 are exemplary diagrams illustrating a curve reference of the method for producing a classifier for recognizing an obstacle, according to an exemplary embodiment of the present invention.

FIGS. 7 to 8 are exemplary diagrams for describing the curve reference of the method for producing a classifier for recognizing an obstacle. The curve reference may be determined by continuously expressing a direction at which a grid adjacent to a predetermined end point is positioned as a vector as illustrated the exemplary FIG. 7.

In other words, as illustrated in FIG. 8, when a grid is positioned above the corresponding grid, the curve reference may be expressed as "0", and when the next is positioned diagonally upward from the corresponding grid, the curve reference may expressed as "1". Furthermore, the reference may be changed by setting grid position diagonally upward to "0" and the vector may be formed while tracking the direction of the grid again. As a result, in the exemplary coordinate illustrated in FIG. 8, the curve reference may be expressed as the following vector.

$$Flexuous(10,12)=(0,0,1,1,2,2,2,1,1,0,1,1,1,2,0,1,1,2,1,2,0,2)=24$$

In the vector of FIG. 8, the curve references may be enumerated using a coordinate of (10, 12) as a reference start point.

The classifier may be produced by using the feature reference values of the region reference and the distance reference.

Figure 9:
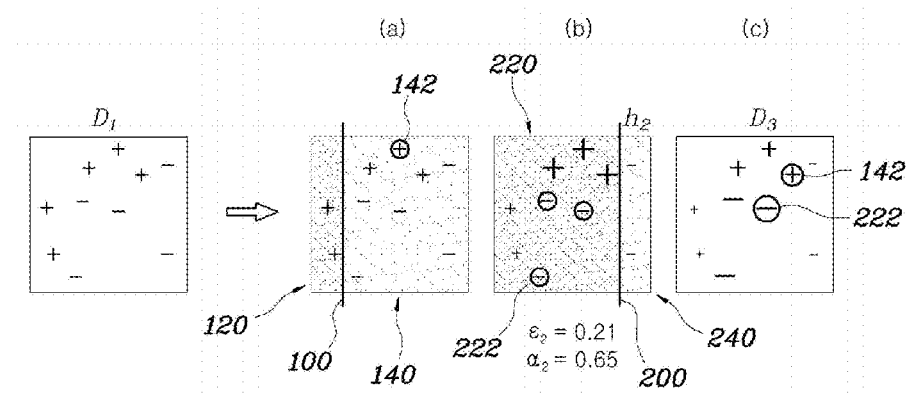
FIGS. 9 to 10 are exemplary diagrams illustrating the method for producing a classifier for recognizing an obstacle, according to an exemplary embodiment of the present invention.
Figure 10:
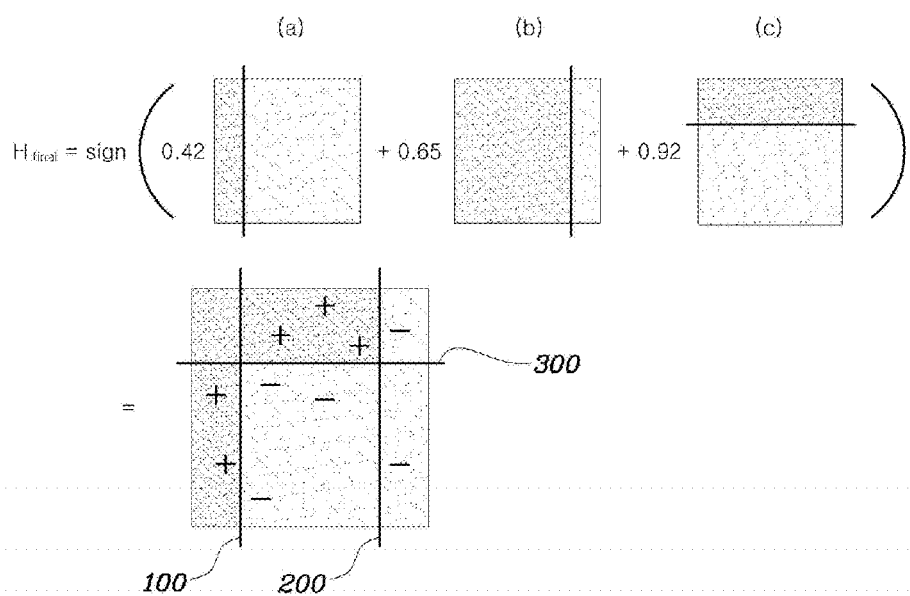

FIGS. 9 to 10 are exemplary diagrams for describing the method for producing a classifier for recognizing an obstacle. As illustrated in FIG. 9, a coordinate value may be analyzed based on three references and a predetermined value may be input.

In FIG. 9A, when one feature reference 100 is arbitrarily selected and substituted, a left 120 region and a right 140 region may be determined as "+" and "−", respectively. In this embodiment, "+" values 142 positioned in the right 140 region of the feature reference may be sensed as an error. Thus, a weight enlarging the values may be applied to the corresponding feature reference 100.

In FIG. 9B, similarly, a second feature reference 200 may be substituted to be divided into a left 220 and a right 240 region and "−" values 222 positioned in the left 220 region may be sensed as an error and a weight may be applied to the corresponding feature reference. In FIG. 9C, as a combination result thereof, the values 142 and 222 sensed as errors may be enlarged according to the applied weights.

FIG. 10 illustrates applying the weight similarly to FIG. 9, wherein various feature references 100, 200, and 300 may have separate weights and may overlap (a, b, and c) to be deduced as the classifier.

Additionally, the classifier may be produced by detecting the errors by repeating the substitution of the feature references after applying the weights and modifying the weights.

According to the present invention, when the processor automatically produces the classifier, the produced classifier may be applied to the vehicle to thereby distinguish the obstacle.

According to the classifier for recognizing the obstacle as described above, the accuracy of the classifier may be increased by both producing the classifier based on various features and using the distance measurement sensor. To further improve the accuracy of the classifier, varying weights may be applied to the references which may be determined by variously combining distance based features and region based features.

The invention has been described in detail with reference to exemplary embodiments thereof. However, it will be appreciated by those skilled in the art that alterations, modifications and variations may be made in these embodiments without departing from the principles and spirit of the invention, the scope of which is defined in the appended claims and their equivalents.

What is claimed is:

1. A system for producing a classifier for recognizing an obstacle, comprising:
a processor configured to:
display surface data of a plurality of obstacles measured by a distance measurement sensor in a two-dimensional (2D) coordinate system;
group and classify the surface data displayed in the 2D coordinate system for each obstacle;
project the surface data of each obstacle vertically to a ground surface coordinate system having an X-Y axis parallel to a ground surface;
set a plurality of feature references to analyze region based features displayed for each obstacle in the 2D coordinate system and calculate the respective feature references for each obstacle; and
produce the classifier by applying a weight to each of the feature references.

2. The system of claim 1, wherein the processor is further configured to control the weight when a result value is not matched with a predetermined value by deducing a result value depending on the produced classifier and comparing the result value with the predetermined value to display the surface data.

3. The system of claim 1, wherein the distance measurement sensor may be selected from a group consisting of: a radar sensor and a laser sensor.

4. The system of claim 1, wherein the feature references further comprise:
an area reference, wherein the area reference is a space occupied by the obstacle grouping in the 2D coordinate system;
a centroid reference, wherein the centroid reference is a coordinate value of a centroid of the obstacle grouping displayed in the 2D coordinate system;
a spacing reference, wherein the spacing reference is a level in which the surface data corresponding to each obstacle displayed in the 2D coordinate system is spaced apart from the coordinate value of the centroid of each corresponding obstacle;
a perimeter reference, wherein the perimeter reference is a perimeter length value of the obstacle grouping; and
a roundness reference, wherein the roundness reference is a roundness level calculated by the area value and the perimeter length value of the obstacle grouping.

5. A non-transitory computer medium containing program instructions executed by a processor, the computer readable medium comprising:
program instructions that display surface data of a plurality of obstacles measured by a distance measurement sensor in a two-dimensional (2D) coordinate system;
program instructions that group and classify the surface data displayed in the 2D coordinate system for each obstacle;
program instructions that project the surface data of each obstacle vertically to a ground surface coordinate system having an X-Y axis parallel to a ground surface;
program instructions that set a plurality of feature references to analyze region based features displayed for each obstacle in the 2D coordinate system and calculate the respective feature references for each obstacle; and
program instructions that produce the classifier by applying a weight to each of the feature references.

6. The non-transitory computer medium of claim 5, further comprising program instructions that control the weight when a result value is not matched with a predetermined value by deducing a result value depending on the produced classifier and comparing the result value with the predetermined value to display the surface data.

7. The non-transitory computer medium of claim 5, wherein the distance measurement sensor may be selected from a group consisting of: a radar sensor and a laser sensor.

8. The non-transitory computer medium of claim 5, wherein the feature references further comprise:
an area reference, wherein the area reference is a space occupied by the obstacle grouping in the 2D coordinate system;
a centroid reference, wherein the centroid reference is a coordinate value of a centroid of the obstacle grouping displayed in the 2D coordinate system;
a spacing reference, wherein the spacing reference is a level in which the surface data corresponding to each obstacle displayed in the 2D coordinate system is spaced apart from the coordinate value of the centroid of each corresponding obstacle;
a perimeter reference, wherein the perimeter reference is a perimeter length value of the obstacle grouping; and
a roundness reference, wherein the roundness reference is a roundness level calculated by the area value and the perimeter length value of the obstacle grouping.

* * * * *